Figure 1:
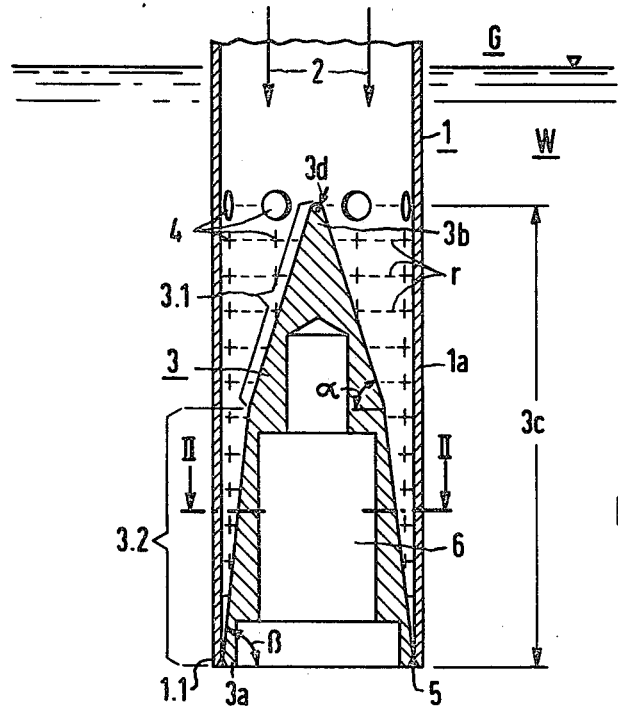

United States Patent [19]

Simon et al.

[11] 4,202,731
[45] May 13, 1980

[54] CONDENSATION TUBE FOR A BLOW-OFF DEVICE FOR LIMITING EXCESS PRESSURE IN NUCLEAR POWER PLANTS, ESPECIALLY IN BOILING WATER NUCLEAR POWER PLANTS

[75] Inventors: Ulrich Simon, Frankfurt am Main-Oberrad; Klaus-Dieter Werner, Frankfurt am Main-Langen; Bernd Pontani, Alzenau, all of Fed. Rep. of Germany

[73] Assignee: Kraftwerk Union Aktiengesellschaft, Mülheim, Fed. Rep. of Germany

[21] Appl. No.: 787,324

[22] Filed: Apr. 14, 1977

[30] Foreign Application Priority Data

Apr. 15, 1976 [DE] Fed. Rep. of Germany ....... 2616831

[51] Int. Cl.² .............................................. G21C 9/00
[52] U.S. Cl. ...................................... 176/37; 176/38
[58] Field of Search ....................... 176/37, 38, 87, 65; 261/77, 121 R, 122, 123, 124

[56] References Cited

U.S. PATENT DOCUMENTS

| 1,182,260 | 5/1916 | Fleming | 261/121 R |
| 1,641,394 | 11/1925 | Martin | 261/123 |
| 1,740,441 | 12/1929 | Chogo | 261/77 |
| 3,323,249 | 6/1967 | Randall | 261/121 R |
| 4,022,655 | 5/1977 | Gaouditz et al. | 176/38 |

*Primary Examiner*—Samuel W. Engle
*Assistant Examiner*—S. A. Cangialosi
*Attorney, Agent, or Firm*—Herbert L. Lerner

[57] ABSTRACT

In a blow-off device for limiting excess pressure in nuclear power plants, a condensation tube disposed so that a lower outlet end thereof is immersed in a volume of water in a condensation chamber having a gas cushion located in a space above the volume of water, and an upper inlet end of the condensation tube extends out of the volume of water and is connectible to a source of steam that is to be condensed or a steam-air mixture, the outlet end of the tube, for stabilizing the condensation, being provided with a base member at the mouth of the tube for limiting steam flows discharging in axial direction of the tube and being formed with lateral outlet openings for subdividing the steam flow and the bubbles produced in the volume of water, the base member at the tube mouth being formed at a conical insert member having a base fastened to the condensation tube in vicinity of the mouth thereof and having an apex extending into the tube mouth, the lateral outlet openings being disposed at least within the axial range of the insert member.

8 Claims, 3 Drawing Figures

CONDENSATION TUBE FOR A BLOW-OFF DEVICE FOR LIMITING EXCESS PRESSURE IN NUCLEAR POWER PLANTS, ESPECIALLY IN BOILING WATER NUCLEAR POWER PLANTS

The invention relates to a condensation tube for a blow-off device for limiting excess pressure in nuclear power plants, especially in boiling water nuclear power plants, and more particularly wherein the condensation tube is disposed so that a lower outflow or outlet end thereof is immersed in a volume of water in a condensation chamber or water receiver having a gas cushion located in a space above the volume of water, and the upper inflow or inlet end of the condensation tube extends out of the volume of water and is connected to a source of steam that is to be condensed or a steam-air mixture, the outlet end of the condensation tube, for stabilizing the condensation, being provided with a base member at the mouth of the condensation tube for limiting the steam flows discharging in axial direction of the tube, and being formed with lateral outlet openings subdividing the steam flow and bubbles produced in the volume of water.

Such a condensation tube has become known heretofore from German Published Prosecuted Application DT-AS No. 2 212 761. It has particular importance for the so-called pressure reduction system, which condenses the discharging steam and thereby depressurizes or relieves the safety vessel in the event of an accident. In this system, the reactor pressure vessel and the coolant circulatory loops are disposed in a relatively small pressure chamber formed of steel or prestressed concrete, which is pressure-proof and technically gas-tight. The condensation tubes extend out of this pressure chamber into a condensation chamber and are immersed in a water basin (water receiver) that is always filled therein. The pressure chamber and the condensation chamber are enclosed by the safety vessel. The pressure reduction system is located in a reactor building which is always maintained at a slightly negative pressure. If steam is set free because of a possible break in an equipment component in the pressure chamber, the pressure chamber thus cushions or blocks the pressure shock. The water vapor or steam flows into the condensation chamber and is condensed therein. The pressure reduction system has, however, not only the function of the condensation of the steam during coolant loss trouble, but also serves as auxiliary condenser during given reactor transients. That which is especially involved therewith is the blow-off of steam from blow-off lines of the pressure relief and safety valve, and the exhaust steam of the emergency condensation and emergency feed turbines.

It is of importance for the condensation process that a very broad spectrum of possible steam flow densities is provided. Thus, in the case of blow-off of the relief valves in the respective condensation tubes, high steam flow densities exist, the same being true at the start of coolant loss trouble. In the exhaust steamlines and the respective condensation tubes of the emergency condensation and the emergency feed turbines as well as in the course of a coolant loss occurrence, the steam flow densities are, by contrast, very low. Even lower steam flow densities can occur also in the condensation tubes connected to the blow-off lines of the depressurizing or relief valves and, in fact, when a relief valve springs a leak, and a lingering or creeping steam flow sets in. THe incident steam flow densities drop from about 1,000 kg/m$^2$ sec during blow-off of the relief valves down to 2 to 10 kg/m$^2$ sec during the creeping flow.

It is accordingly an object of the invention to provide a condensation tube for a blow-off device for limiting excess pressure in nuclear power plants, especially in boiling water nuclear power plants, that are of such improved construction that a stabilized condensation is assured over the entire spectrum of the steam flows. Furthermore, it is an object to provide such a condensation tube that can be produced rather simply at relatively low cost for manufacturing technology. In this regard, it is an object of the invention especially to damp the return flow of water into the condensation tube which occurs for smaller steam flow densities, and thus to stabilize the condensation process.

With the foregoing and other objects in view, there is provided, in accordance with the invention in a blow-off device for limiting excess pressure in nuclear power plants, a condensation tube disposed so that a lower outlet end thereof is immersed in a volume of water in a condensation chamber having a gas cushion located in a space above the volume of water, and an upper inlet end of the condensation tube extends out of the volume of water and is connectible to a source of steam that is to be condensed or a steam-air mixture, the outlet end of the tube for stabilizing the condensation, being provided with a base member at the mouth of the tube for limiting steam flows discharging in axial direction of the tube and being formed with lateral outlet openings for subdividing the steam flow and the bubbles produced in the volume of water, the base member at the tube mouth being formed as a conical insert member having a base fastened to the condensation tube in vicinity of the mouth thereof and haing an apex extending into the tube mouth, the lateral outlet openings being disposed at least within the axial range of the insert member.

The advantages attainable by the invention are primarily that, over the entire spectrum of the steam flows that come in question, a stabilized condensation process is provided and the outlet geometry can be produced and attached in a simple manner. The conical insert member effects a markedly impact-free transfer of the steam flows oriented in axial direction into the radial outlet direction of the hole rows. During condensation with lower steam flow density, the conical insert member diminishes the return flows of the water into the interior of the condensation tube and thereby stabilizes the form of the condensation with these steam flow densities.

In accordance with another feature of the invention, the insert member is subdivided into at least two cone sections having respectively different base angles, the cone section having the steeper or steepest casing surface being located at the extreme end of the condensation tube.

In accordance with a further feature of the invention, the steepness of the conical insert member continuously increases starting with the apex of the conical member down to the base thereof.

In accordance with an added feature of the invention, the insert member is a hollow member.

In accordance with an additional feature of the invention, the conical insert member is secured by a weldment to a marginal region of the condensation tube at the mouth thereof.

Depending upon the steam velocity and the flow rate or size of the volume flowing, either the first cone section with the hole rows associated therewith or both cone sections with all of the hole rows become effective while, due to the sharp constriction of the space in the interior of the tube at the level of the steeper cone section, an effective reduction of the return flow of the water is produced in the case of small steam flows.

In accordance with yet another feature of the invention, the conical insert member has an obtuse apex angle, and has a casing surface provided with guidance cross-pieces extending radically outwardly from the axis of the conical insert member, the guidance cross-pieces defining outlet channels terminating in the lateral outlet openings.

In accordance with yet a further feature of the invention, the conical insert member has a base surface with a diameter greater than that of the inner diameter of the condensation tube, and insert member with the guidance cross-pieces thereof being held in a widened section of the wall of the condensation tube.

In accordance with a concomitant feature of the invention, the widened tube-wall section with the insert member and the guidance cross-pieces form a separate attachment having a throat portion by which the attachment is welded to the condensation tube.

Although the invention is illustrated and described herein as embodied in condensation tube for a blow-off device for limiting excess pressure in nuclear power plants, especially in boiling water nuclear power plants, it is nevertheless not intended to be limited to the details shown, since various modifications and structural changes may be made therein without departing from the spirit of the invention and within the scope and range of equivalents of the claims.

Figure 2:
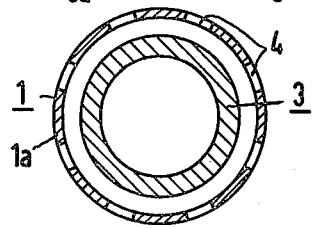
Figure 3:
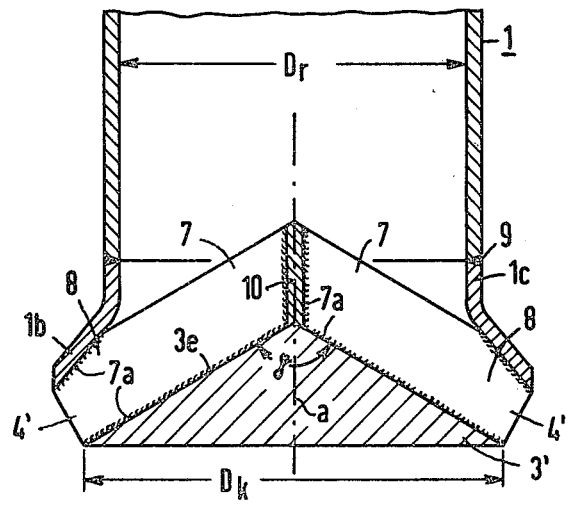

The construction and method of the invention, however, together with additional objects and advantages thereof will be best understood from the following description of specific embodiments when read in connection with the accompanying drawings, in which:

FIG. 1 is a diagrammatic longitudinal sectional view of the outlet or outflow end of a condensation tube constructed in accordance with the invention;

FIG. 2 is a cross-sectional view of FIG. 1 taken along the line II—II in direction of the arrows; and FIG. 3 is an enlarged fragmentary view of FIG. 1 showing another embodiment of the invention wherein the conical insert member is of comparatively flatter construction than that of the embodiment of FIG. 1 and has only one row of holes in contrast to the many rows of holes in the embodiment of FIG. 1.

Referring now to the drawing and first, particularly, to FIGS. 1 and 2 thereof, there is shown a condensation tube 1 employed in blow-off devices of the hereinaforementioned type. The condensation tube 1 has an outlet end 1a which is immersed in a water receiver W of a condensation chamber. Above the water receiver W is a gas or air cushion G of the condensation chamber which is not otherwise shown. To stabilize the condensation of the flows of steam and steam-air mixture represented by the arrows 2, the outlet end 1a is provided with a base member 3 at the tube mouth for limiting steam flows discharging in axial direction of the condensation tube 1, and is formed with lateral outlet openings 4 which are made up of rows of holes or bores distributed in peripheral direction, and in axial direction over the mouth end 1a. The steam flow 2 and the bubbles produced in the volume of water W are subdivided thereby. The base member 3 at the tube mouth is constructed as a conical insert member, the base 3a of which is fastened in the marginal region 1.1 of the tube mouth by a circular welding seam 5, and the apex 3b of which extends into the mouth of the condensation tube 1. The lateral outlet openings 4 or hole rows r are disposed only in the tube-axial regions 3c of the insert member 3. In the illustrated embodiment of FIGS. 1 and 2, twelve axially succeeding hole rows r are provided for, respectively, eight bores, through which the steam, diverted by the insert member 3 and intimately intermixed with the water bath W, discharges axially-radially in finely divided condition. The condensation of the partial steam flows or the condensation bubbles is effected there. The insert member 3 is provided at the apex 3b thereof with a flow-facilitating rounded-off radius 3d. As is apparent, the insert member 3 is subdivided into two cone sections 3.1 and 3.2 with respective base angles $\alpha$ and $\beta$, the cone section 3.2 having the steeper casing surface (base angle $\beta$ being greater than base angle $\alpha$) being located at the end of the condensation tube 1. For greater lengths of the tube-axial region of the insert member, the latter may be provided with more than two conical sections of increasing steepness. Also, the steepness of the insert member-cone could increase continuously beginning at the apex 3b therefor and continuing down to the base thereof.

As can be seen, the insert member 3 is constructed as a hollow member (hollow space 6). In the illustrated embodiment of FIGS. 1 and 2, it is bored stepwise; it could also be formed as a cast hollow member, preferably in a pressure casting process, or from a blank or stock member in an hydraulic deep drawing process.

In the embodiment of FIG. 3, the insert member-cone 3' has an obtuse apex angle $\gamma$, and the casing surface 3e thereof is provided with guide cross-pieces 7 extending radially outwardly from the cone axis a. Through these guide cross-pieces 7, outlet channels 8 are formed which terminate in the lateral outlet opening 4'.

As is readily evident, the diameter $D_k$ of the base surface of the cone 3' is greater than the inner diameter $D_r$ of the condensation tube 1, so that the outlet openings 4' likewise lie on an enlarged diameter and, at a given inner diameter $D_r$ of the tube 1, a greater number of outlet openings 4' can be provided. The insert member 3' is held with the cross-pieces 7 thereof in a widened tube wall-section 1b, and the latter with the insert member 3' and the guide cross-pieces 7 as a separate structural component, with a throat portion 1c having the same dimensions as the condensation tube 1 per se, is welded to the latter by a circular welding seam or weldment 9.

The cross-pieces 7 are welded by means of the welding seams 7a to the widened tube wall 1b, the casing surface 3e of the insert member 3' and a central pin 10. A fine division and subdivision of the steam flows and the condensation bubbles are attained also with this embodiment of FIG. 3.

The scope of the invention also encompasses an embodiment wherein the insert member and the associated parts of the tube mouth according to FIG. 1 are constructed as a separate structural member with an inner diameter which corresponds to the outer diameter of the condensation tube 1 so that this structural member can be separately produced and subsequently slid onto the condensation tube 1 and can be welded thereto. The hereinaforementioned fastening means applies also to the embodiment of FIG. 3.

There are claimed:

1. In a blow-off device for limiting excess pressure in nuclear power plants, a condensation tube disposed so that a lower outlet end thereof is immersed in a volume of water in a condensation chamber having a gas cushion located in a space above the volume of water, and an upper inlet end of the condensation tube extends out of the volume of water and is connectible to a source of steam that is to be condensed or a steam-air mixture, the outlet end of the tube, for stabilizing the condensation, being provided with a base member at the mouth of the tube permanently closing said tube mouth against discharge of steam flows in axial direction of the tube, and being formed with lateral outlet openings for discharging and for subdividing the steam flow and the bubbles produced in the volume of water so as to discharge the steam substantially transverse to the axis of the tube, the base member at the tube mouth being formed as a conical insert member having a base fastened to the condensation tube in vicinity of the mouth thereof and having an apex extending into the tube mouth, the lateral outlet discharge openings being disposed at least within the axial range of the insert member.

2. Condensation tube according to claim 1 wherein said insert member is a hollow member.

3. Condensation tube according to claim 1 wherein said base of said conical insert member is secured by a weldment to a marginal region of the condensation tube at said mouth thereof.

4. In a blow-off device for limiting excess pressure in nuclear power plants, a condensation tube disposed so that a lower outlet end thereof is immersed in a volume of water in a condensation chamber having a gas cushion located in a space above the volume of water, and an upper inlet end of the condensation tube extends out of the volume of water and is connectible to a source of steam that is to be condensed or a steam-air mixture, the outlet end of the tube, for stabilizing the condensation, being provided with a base member at the mouth of the tube for limiting steam flows discharging in axial direction of the tube, and being formed with lateral outlet openings for subdividing the steam flow and the bubbles produced in the volume of water, the base member at the tube mouth being formed as a conical insert member having a base fastened to the condensation tube in vicinity of the mouth thereof and having an apex extending into the tube mouth, the lateral outlet openings being disposed at least within the axial range of the insert member, said insert member being subdivided into at least two cone sections having respectively different base angles, the cone section having the steeper casing surface being located at the extreme end of the condensation tube.

5. Condensation tube according to claim 4 wherein the steepness of the conical insert member continuously increases starting with the apex of the conical member down to the base thereof.

6. In a blow-off device for limiting excess pressure in nuclear power plants, a condensation tube disposed so that a lower outlet end thereof is immersed in a volume of water in a condensation chamber having a gas cushion located in a space above the volume of water, and an upper inlet end of the condensation tube extends out of the volume of water and is connectible to a source of steam that is to be condensed or a steam-air mixture, the outlet end of the tube, for stabilizing the condensation, being provided with a base member at the mouth of the tube for limiting steam flows discharging in axial direction of the tube, and being formed with lateral outlet openings for subdividing the steam flow and the bubbles produced in the volume of water, the base member at the tube mouth being formed as a conical insert member having a base fastened to the condensation tube in vicinity of the mouth thereof and having an apex extending into the tube mouth, the lateral outlet openings being disposed at least within the axial range of the insert member, said conical insert member having an obtuse apex angle, and having a casing surface provided with guidance cross-pieces extending radially outwardly from the axis of the conical insert member, said guidance cross-pieces defining outlet channels terminating in the lateral outlet openings.

7. Condensation tube according to claim 6 wherein said conical insert member has a base surface with a diameter greater than that of the inner diameter of the condensation tube, and said insert member with said guidance cross-pieces thereof being held in a widened section of the wall of the condensation tube.

8. Condensation tube according to claim 7 wherein said widened tube wall section with said insert member and said guidance cross-pieces form a separate attachment having a throat portion by which said attachment is welded to the condensation tube.

* * * * *